UNITED STATES PATENT OFFICE.

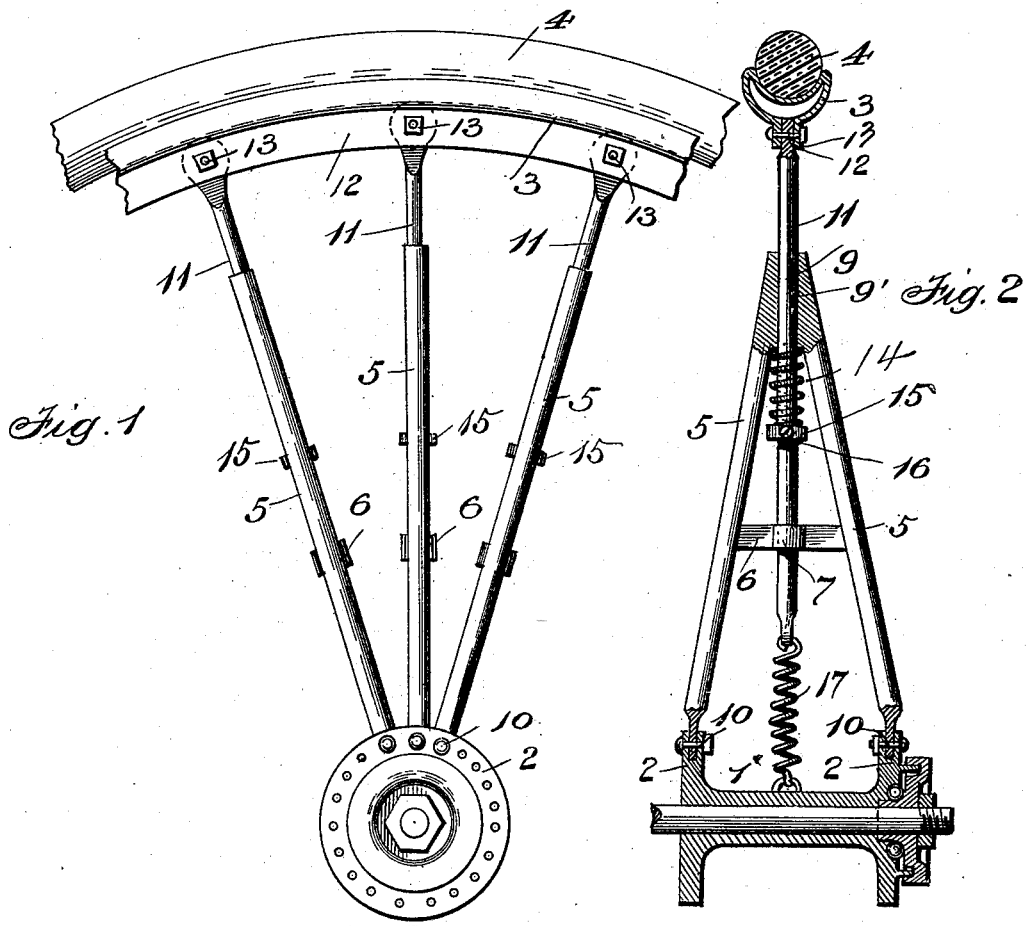

BENJAMIN F. STAUBER, OF JEWELL CITY, KANSAS.

BICYCLE-WHEEL.

SPECIFICATION forming part of Letters Patent No. 553,436, dated January 21, 1896.

Application filed July 22, 1895. Serial No. 556,781. (No model.)

*To all whom it may concern:*

Be it known that I, BENJAMIN F. STAUBER, a citizen of the United States, residing at Jewell City, in the county of Jewell and State of Kansas, have invented certain new and useful Improvements in Bicycle-Wheels; and I do declare the following to be a full, clear, and exact description of the invention, such as will enable others skilled in the art to which it appertains to make and use the same.

My invention relates to wheels, and more particularly to wheels for bicycles.

The object of the invention is to provide a wheel of this character which shall yield to obstructions in the road and thereby relieve the rider of all unnecessary jar.

With this object in view the invention consists of certain features of construction and combination of parts, which will be hereinafter fully described and claimed.

In the accompanying drawings, Figure 1 is a side elevation of a wheel constructed in accordance with my invention. Fig. 2 is an enlarged view of a portion of the hub, spokes, rim, and the tire of the wheel, showing more clearly the details of construction.

In the drawings, 1 denotes the hub of a wheel, which may be of any well-known or approved form and which is provided with the usual spoke-attaching disks 2.

3 denotes the rim of the wheel, and 4 the tire secured thereto.

The spokes each consist of two diverging arms 5 connected intermediate their ends by a cross-piece 6 having a central aperture 7, and connected at their outer ends by a cross-piece 9, having an aperture 9' coincident with the aforesaid aperture. The inner ends of the diverging arms are pivoted by bolts 10 to the spoke-attaching disks 2. A rod 11 extends through the apertures in said cross-pieces, and has its outer end reduced and pivoted between the inwardly-projecting flanges 12 of the rim by a bolt 13. A coil tension-spring 14 encircles this rod between the cross-pieces and has its lower end secured to the outer cross-piece and its inner end secured to a collar 15, which is held fixed to the rod by a set-screw 16, and which also limits the inward movement of the rod by coming in contact with the inner cross-piece.

To secure the proper tension between the rim and hub I employ the springs 17, each of which has one of its ends secured to the free inner end of the rod 11, while its other end is fastened to the hub.

From the foregoing description, taken in connection with the accompanying drawings, the construction of the wheel will be readily understood without requiring further explanation.

Having thus described my invention, what I claim, and desire to secure by Letters Patent, is—

In a bicycle wheel, the combination with the hub, the disks formed therewith, the diverging spokes secured to said disks having apertured cross pieces at the outer ends, and the inner cross pieces connecting said spokes, of the rim, the rods pivotally connected therewith passing through the apertures in said cross pieces, the collars secured to said rods, the coiled tension springs secured to said rods and bearing against the collars, and the coiled springs connected with the inner ends of said rods and the wheel hub, substantially as described.

In testimony whereof I affix my signature in presence of two witnesses.

BENJAMIN F. STAUBER.

Witnesses:
J. C. POSTLETHWAITE,
W. C. POSTLETHWAITE.